United States Patent [19]

James et al.

[11] Patent Number: 5,721,845
[45] Date of Patent: Feb. 24, 1998

[54] TOPICALLY ORGANIZED INTERFACE WITH REALISTIC DIALOGUE

[75] Inventors: Arthur James, San Jose; Catherine Anne Abbott, Campbell; Michael Andrew Arent, Albany; Gregory J. Czora, Cupertino; James M. Laffey, Sunnyvale; William W. Luciw, Morgan Hill; Mark Leslie Miller, San Carlos; Daniel E. Rose, Cupertino; James Clinton Spohrer, Santa Clara; James Reginald Winkles, Stanford, all of Calif.

[73] Assignee: Apple Computer, Inc., Cupertino, Calif.

[21] Appl. No.: 19,239

[22] Filed: Feb. 18, 1993

[51] Int. Cl.⁶ .................................................. G06F 17/00
[52] U.S. Cl. .................... 395/326; 395/353; 395/961; 395/927; 434/322; 434/327
[58] Field of Search ................................. 434/322, 323, 434/327, 219, 227; 395/600, 149, 153, 154, 155, 156, 157, 160, 161, 12, 927; 364/410, 419.08

[56] References Cited

U.S. PATENT DOCUMENTS

| | | | |
|---|---|---|---|
| 4,688,195 | 8/1987 | Thompson et al. | 395/12 |
| 4,823,283 | 4/1989 | Diehm et al. | 395/157 |
| 4,829,423 | 5/1989 | Tennant et al. | 364/200 |
| 4,931,935 | 6/1990 | Ohira et al. | 364/419 |
| 4,994,967 | 2/1991 | Asakawa | 364/419 |
| 5,006,998 | 4/1991 | Yasunobu et al. | 395/77 |
| 5,033,969 | 7/1991 | Kamimura | 434/322 |
| 5,041,967 | 8/1991 | Ephrath et al. | 395/600 |
| 5,155,806 | 10/1992 | Hoeber et al. | 395/157 |
| 5,179,654 | 1/1993 | Richards et al. | 395/157 |
| 5,187,797 | 2/1993 | Nielsen et al. | 395/800 |
| 5,239,617 | 8/1993 | Gardner et al. | 395/12 |
| 5,265,014 | 11/1993 | Haddock et al. | 364/419.08 |
| 5,267,865 | 12/1993 | Lee et al. | 434/350 |
| 5,310,349 | 5/1994 | Daniels et al. | 434/350 |
| 5,369,763 | 11/1994 | Biles | 395/603 |
| 5,377,103 | 12/1994 | Lamberti et al. | 395/759 |

OTHER PUBLICATIONS

Frederich N. Tou, et al., "RABBIT; An Intelligent Database Assistant", Aug. 1982, pp. 314–318.

James C. Spohrer, et al., "A Role Playing Simulator for Needs Analysis Consultations", 1991.

Scott M. Stevens, "Intelligent Interactive Video Simulation of a Code Inspection", Communications of the ACM Jul. 1989, vol. 32, No. 7, pp.832–843.

Harry R. Tennant, et al., "Menu–Based Natural Language Understanding", 1983, pp. 151–158.

Arthur James and Jim Winkles, "Role'm –A role–play simulation," Jul. 27, 1993, pp. 1–37.

James C. Spohrer et al., "A Role Playing Simulator for Needs Analysis Consultations," The World Congress on Expert Systems Proceedings, pp. 2829–2837, 1991, Pergamon Press Inc.

*Primary Examiner*—Paul V. Kulik
*Attorney, Agent, or Firm*—David J. Larwood

[57] ABSTRACT

A method and apparatus for formulating and responding to an inquiry through an interface which is topically organized. The dialogue system interface is comprised of various topical objects wherein each domain object has a set of object values. Selection of a desired object value of a domain object yields a set of potential inquiries, corresponding to the selected value, for selection. A selected inquiry is transmitted to an underlying system for formulation of a response. The formulated response of the underlying system is then transmitted to the user through the dialogue system interface. The dialogue system generates and displays further domain objects, object values, and inquiries that are logically anticipated from the selected inquiry.

26 Claims, 19 Drawing Sheets

TOPICALLY ORGANIZED INTERFACE WITH REALISTIC DIALOGUE

FIELD OF THE INVENTION

This invention generally relates to the formation of an inquiry sentence through a topically organized interface, and more particularly, to a realistic dialogue exchange between a computer user and an underlying system through a user interface.

BACKGROUND OF THE INVENTION

The need for technological solutions to learning is abundant. In particular, there exists an unfulfilled need for an intelligent and interactive interface system that is able to respond to user inquiries as well as engage in role playing simulations.

Role play simulation involves a simulation in which a user of a computer system interacts with an underlying system. The underlying system accepts and responds to the user with natural language in a manner consistent with how an actual human might behave. Hence, role play simulation provides users with a method of enhancing interpersonal skills by engaging in conversations in a real context.

The need for role play simulation as an educational tool follows from showings that role playing is an effective technique for teaching interactive skills as well as a substitute for skills gained through experience. Role playing in classrooms is often ineffective, however, because of the inability to realistically capture the essence of a simulation and the inability to give precise feedback.

Tangential attempts have been made to satisfy such a demand through the formulation of computerized information systems which respond to inquiries made in natural language. The primary application for natural language interfaces has been to natural language database query systems. For all natural language systems, the user has been required to type his question into the keyboard of a computer terminal. When the entire question had been input, the natural language interface attempts to process an input query, or otherwise respond that the query was not understood.

Natural language information retrieval systems are provided with a semantic analysis unit for processing natural language. The semantic analysis unit is designed so as to understand the semantics of an inquiry sentence inputted in a natural language, produce retrieval conditions, and ultimately carry out an information retrieval.

In order for the semantic analysis unit of the system to understand the semantics of words contained within an inquiry sentence, it is required to collate a word with a dictionary and carry out a semantic analysis. It is, however, impossible to register all words, which might be contained in a great variety of inquiry sentences, within a dictionary. Therefore, it follows that a portion of the words within the inquiry sentence, such as an undefined word, are not capable of being collated.

Tennant (1980) performed the first and only extensive evaluation of a natural language interface. This evaluation was performed for the PLANES system, a natural language database query system that accessed a military aircraft maintenance database in natural language. The results of this evaluation show quite clearly why natural language interfaces are not in common use today. About one-third of the queries input to the system by users were incomprehensible by the system, even though the problems assigned these users were specifically designed to correspond with relatively straightforward queries.

Although research into the construction of natural language interfaces has gone on for a number of years, resulting in the construction of many prototype systems, natural language interfaces are not in common use today. One reason for this is that the natural language interfaces that have been constructed to date are overly complex to construct and quite difficult to utilize. Another reason is because all systems that are constructed have many limitations in coverage. That is, the constructed systems can only understand a small subset of all possible natural language queries. A natural language system which can understand all, or even a substantial part of a language, is currently not feasible.

A further reason why natural language interfaces are not in common use today is the large amount of time it has traditionally taken to construct a natural language interface. Current technology is such that each natural language interface must be constructed on a case by case basis for each application. Efforts taking from ten to thirty man years per application are not uncommon. Thus, only applications that can justify such a large expenditure of manpower are candidates for possible applications. However, given the quality of the system that results, the effort has not proven to be worthwhile.

Natural language interfaces that have been constructed employ a grammar which characterizes the class of acceptable input strings. A parser then accesses this grammar to produce a parse tree (or parse trees for an ambiguous input) for the input string. This parse tree is then translated into an expression (or set of expressions) which represent the meaning of an input string and which are interpretable by the computer system for which the natural language interface has been built. A wide variety of intricate grammar formalisms and parsing algorithms have been utilized in such interfaces.

Most grammar formalisms can, however, be classified under the general heading of augmented context-free grammars. Augmented context-free grammars are basic grammar rules of a context-free grammar where each context-free rule has, associated with it, augmentations which give the grammar added power. These augmentations generally access attributes (and sometimes values) of the nodes of the context-free rules.

Linguistic theories based on this class of grammars are those of Gazdar (1982), Bresnan and Kaplan (see Kaplan and Bresnan, 1981 and Bresnan, 1982), and Ross and Saenz (see Ross, 1981 and Saenz, 1982). Parsers for constructing natural language interfaces which utilize grammars of this general class are the DIAMOND Parser developed at SRI (see J. Robinson, 1980), the GPSG Parser developed at HP (see Gawron, King, Lamping, Loebner, Paulson, Pullum, Sag, and Wasow, 1982) and many others. Note that this description is neutral between syntactically-based and semantically-based grammars. In general, these frameworks are adequate for characterizing both classes of grammars.

Natural language parsers are generally based on one of several parsing algorithms that have been employed for parsing context-free grammars (for example, see Earley, 1980, Younger, 1967, Griffiths and Petrick, 1965, and Ross, 1981). First, a context-free parse is performed. Then, the augmentation rules are used. In some systems, a partial context-free parse is initially undertaken. Thereafter, augmentations which are relevant to that portion of the parse are undertaken. This procedure is then iterated until a complete parse is found.

A notable exception to this general trend is the TAQ System that has been under development for the past ten years at IBM (see Plath, 1975 and Petrick, 1973). It is based on the theory of transformational grammar (see Chomsky, 1965) and it employs, as grammar rules, several hundred inverse transformations. A transformational parser applies relevant transformations to yield a set of parse trees.

Because of the numerous problems associated with natural language systems, a number of alternative "restricted natural language systems" have been developed. Restricted natural language systems allow a user to select inquiry sentences. The selected inquiry sentence is then always capable of being interpretable and processed by the underlying system.

U.S. Pat. No. 4,829,423, issued to Tennant et. al., is an example of a restricted natural language system. The Tennant patent discloses a system employing diverse menus from which an inquiry is formulated from beginning to end. At any point in the construction of an inquiry, only a subset of the menus is active. That is, only those menus containing words which are determined to be likely continuations of immediately previously selected words are displayed for selection.

Valid continuations are determined by a parser which uses a predefined grammar to determine which words are valid continuations from a previously selected word, and whether a complete inquiry sentence has been entered. The disclosed system does not, however, preclude the formation of ambiguous inquiries.

Current restricted natural language systems, such as the menu-based system disclosed in the Tennant patent, require a user to undertake a complex and ineffective process in order to formulate an inquiry. Specifically, current restricted natural language systems construct an inquiry sentence from left to right. Unfortunately, the initial words of a sentence may be highly variable, unrelated to the final content of the sentence, or dependent upon the latter words of the inquiry. Moreover, such systems do not protect against ambiguous inquiries. Thus, the prior art that the applicant is aware of provides an interface that is overly complex and ineffective for formulating typical inquiry sentences.

SUMMARY OF THE INVENTION

The present invention overcomes the aforementioned deficiencies of the prior art by providing a method and apparatus for formulating inquiries to an underlying system and delivering responses from the underlying system. The interface is topically organized into an interactive dialogue system. In the present invention, the user is not required to type a well formulated input to a natural language system. Rather, the user is presented with a set of topically related domain objects from which a set of potential inquiries is generated.

The present invention provides users with a convenient and efficient method for selecting a desired inquiry from a large number of inquiries that an underlying system is capable of processing. Specifically, the present invention comprises an interface which presents a series of domain objects where each domain object has one or more values. Selection of an object value of a particular domain object yields a set of potential inquiries. Each of the yielded inquiries relates to the selected object value. The desired inquiry is then selected, and thereafter, a response to the inquiry is given. Domain objects, object values and inquiries that are logically anticipated from the responses are then presented for selection.

The focus of the present invention provides a system for allowing a user to interact with an underlying system, which does not require the user to have knowledge of computer-language or require large expenditures of time to become familiar with the interface system. Further, the present invention allows for inquiries, that are answered by the underlying system to be selected in a topical manner. Still further, the present invention provides a user with a means of assembling inquiries which are logically anticipated from prior inquiries and responses. Moreover, the present invention provides an interface system, in which subsequently presented inquiries and inquiry responses are dependent upon prior inquiries and prior inquiry responses.

DETAILED DESCRIPTION OF THE INVENTION

The present invention is a system interface in which inquiries are formulated and through which responses from an underlying system are presented to a user. The invention employs three component windows. A question window for displaying questions for selection by a user. A response window for conveying information produced by the underlying system in response to the selected question. An object window represents a category of objects and displays the values of each object.

A sentence template contains variables which can be instantiated with the values of the domain object to produce a number of expanded sentences. For example, the sentence template "So <someone><procedure>. Is that satisfactory?" can be instantiated into:

"(a) So the vice president monitors financial information. Is that satisfactory?";

"(b) So the business manager controls the outflow of funds. Is that satisfactory?"; and (c) other possible combinations.

In a preferred embodiment, sentence templates are instantiated in advance by a dialogue system. Thus, when a user selects an object value from an object window, only fully instantiated questions, about the particular object appear in the question window.

In an alternate embodiment, all possible sentence templates appear in the question window. When a user Selects an object value from an object window, the list of template sentences in the question window are parsed and only those questions relevant to the value are presented to the user with the instantiated value. For example, in the sentence template discussed above, if the Vice President was the selected object value for <someone>, then the sentence would be presented with "So, the Vice President <procedure>. Is that satisfactory?"

The present invention presents a user with a means to select a desired inquiry by topically decomposing the inquiry. First, a broad domain object, having a set of object values, is selected. Second, the user selects an object value that is desired to be the subject of the inquiry. Thereafter, the system interface displays a set of inquiries that correspond to the object value. Thus, a user is allowed to think in a topical fashion when formulating an inquiry.

Inquiry sentences are indexed for retrieval based upon the domain objects they contain. Thus, a user can rapidly reduce a large number of inquiry sentences to a more manageable number by selecting appropriate domain objects. Once a desired domain object and object value are selected, all of the inquiries relevant to the selected object value are then displayed.

COMPUTER SYSTEM

Figure 1:
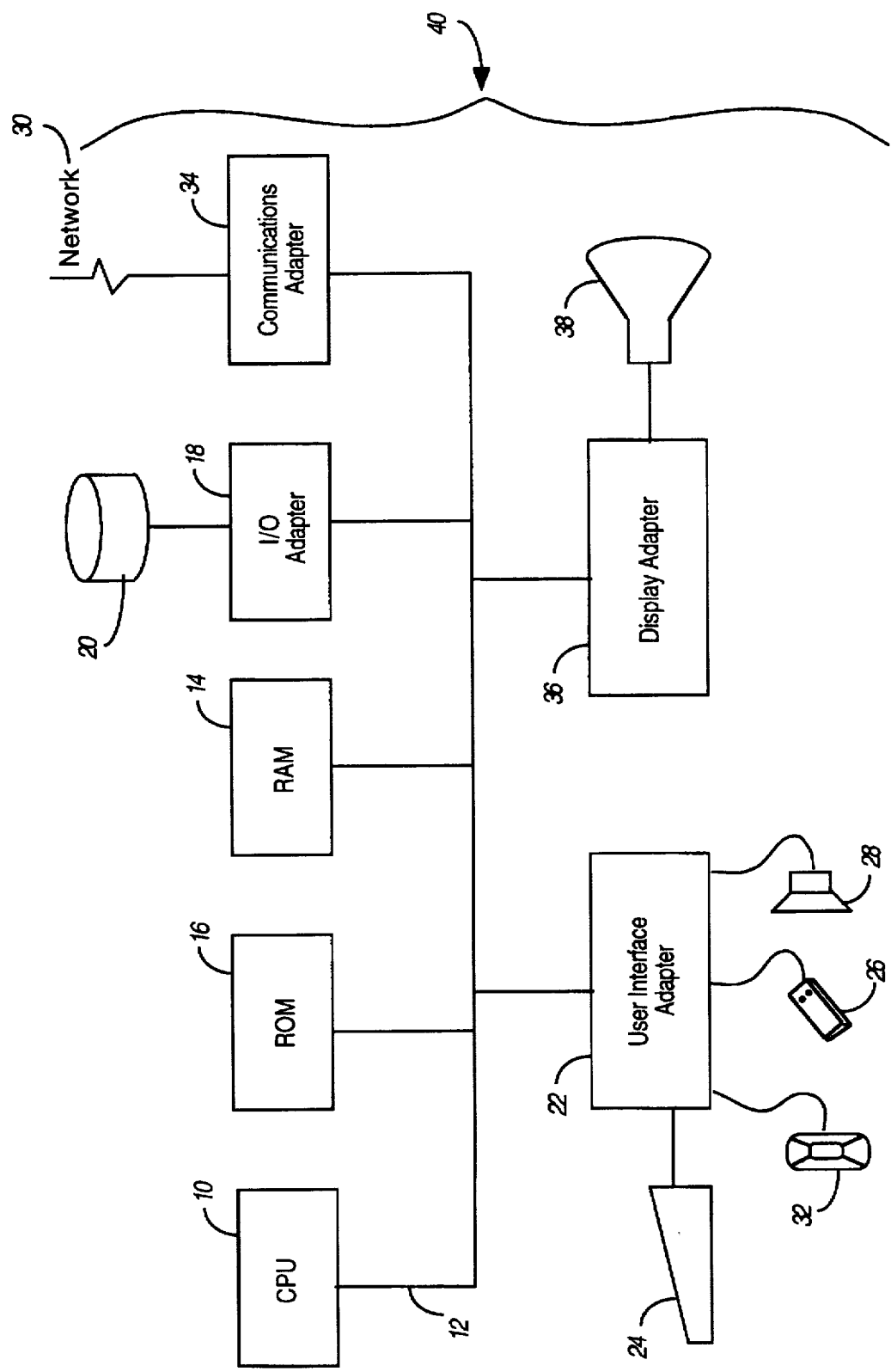
FIG. 1 is a block diagram of a computer system in accordance with the present invention.

A representative hardware environment is depicted in FIG. 1, which illustrates a suitable hardware configuration of a workstation 40 in accordance with the present invention. The workstation 40 has a central processing unit 10, such as a conventional microprocessor, and a number of other units interconnected via a system bus 12. The illustrated workstation 40 shown in FIG. 1 includes a Random Access Memory 14 (RAM), a Read Only Memory 16 (ROM), an I/O adapter 18 for connecting peripheral devices such as disk units to the bus 12, a user interface adapter 22 for connecting a keyboard 24, a mouse 26, a speaker 28, a microphone 32, and/or other user interface devices such as a touch screen device (not shown) to the bus 12. The workstation 40 may also have a communications adapter 34 for connecting the workstation 40 to a data processing network 30 and a display adapter 36 connecting the bus 12 to a display device 38.

SYSTEM INTERFACE

Figure 2:
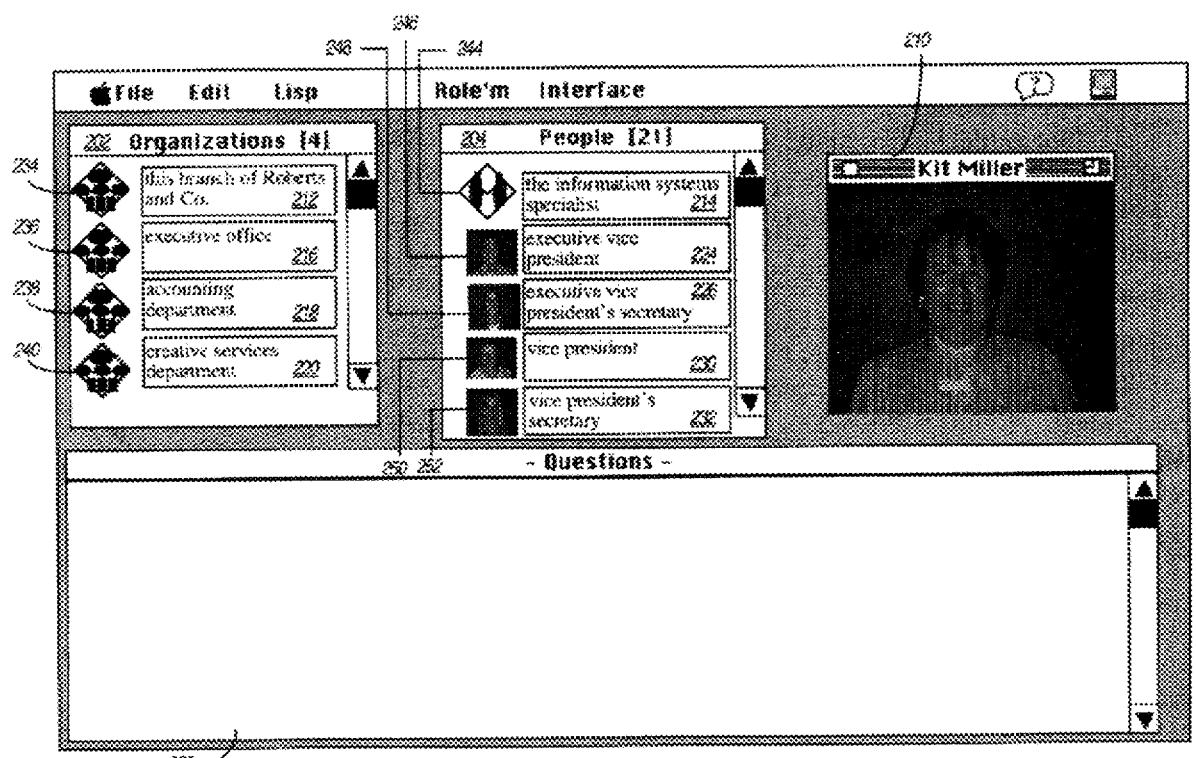
FIG. 2 illustrates an initial system interface for a simulated interview between a sales person and a potential client in accordance with the present invention.

Referring to FIG. 2, an initial screen display of the system interface for a simulated interview between a salesperson and a potential client. In the preferred embodiment, a user is a salesperson and the potential client is simulated by the underlying system. The screen display of the user interface consists of three parts: a response window 210; a questions-window 228; and two domain object windows entitled Organizations 202 and People 204.

Domain object windows 202 and 204 each contain values about which the user may inquire. The user selects an object value to initialize an inquiry by highlighting it with a single mouse click. Inquiries concerning that object value appear in the questions-window 228, thereby replacing any inquiries previously appearing in the questions-window 228.

The Organizations 202 domain object possesses four object values 212, 216, 218, and 220. These object values represent "this branch of Roberts and Co.", the "executive office", the "accounting department", and the "creative services department", respectively. The People 204 domain object possesses five object values which are referred to by reference numerals 214, 224, 226, 230 and 232. These object values represent "the information systems specialist", the "executive vice president", the "executive vice president's secretary", the "vice president", and the "vice president's secretary", respectively.

The aforementioned object values of domain objects 202 and 204 each contain a corresponding icon. Icons provide a means by which selections are made for corresponding articles. Accordingly, object values 212, 216, 218, and 220 of the Organizations 202 domain object have icons 234, 236, 238, and 240, respectively. Similarly, object values 214, 224, 226, 230 and 232 of the People 204 domain object have icons 244, 246, 248, 250, and 252, respectively.

The response window 210 provides a communication channel between the simulated person and a user. The simulated person is represented within the response window in which digital Quicktime™ movies of pre-recorded answers are shown. Each response is formed and communicated by pasting recordings of portions of responses, which are uniform for a number of similar inquiries, with recordings that are specific to the particular inquiry of the user. The pasting is performed in order to minimize the necessary recordings.

The questions-window 228 contains formulated inquiries from which the user may choose to ask of the simulated person. An inquiry may be highlighted with a single mouse click, and selected for inquiry by pressing the return key. Alternatively, the inquiry may be selected and asked in one motion by a double clicking of the mouse. Once an inquiry has been selected, the computed response is delivered through the response window 210. In applications where the answer to an inquiry does not vary as a function of the preceding inquiries and responses, the inquiries are rearranged so that those inquiries which have already been asked are removed or moved to the bottom of the set of inquiries.

Figure 3:
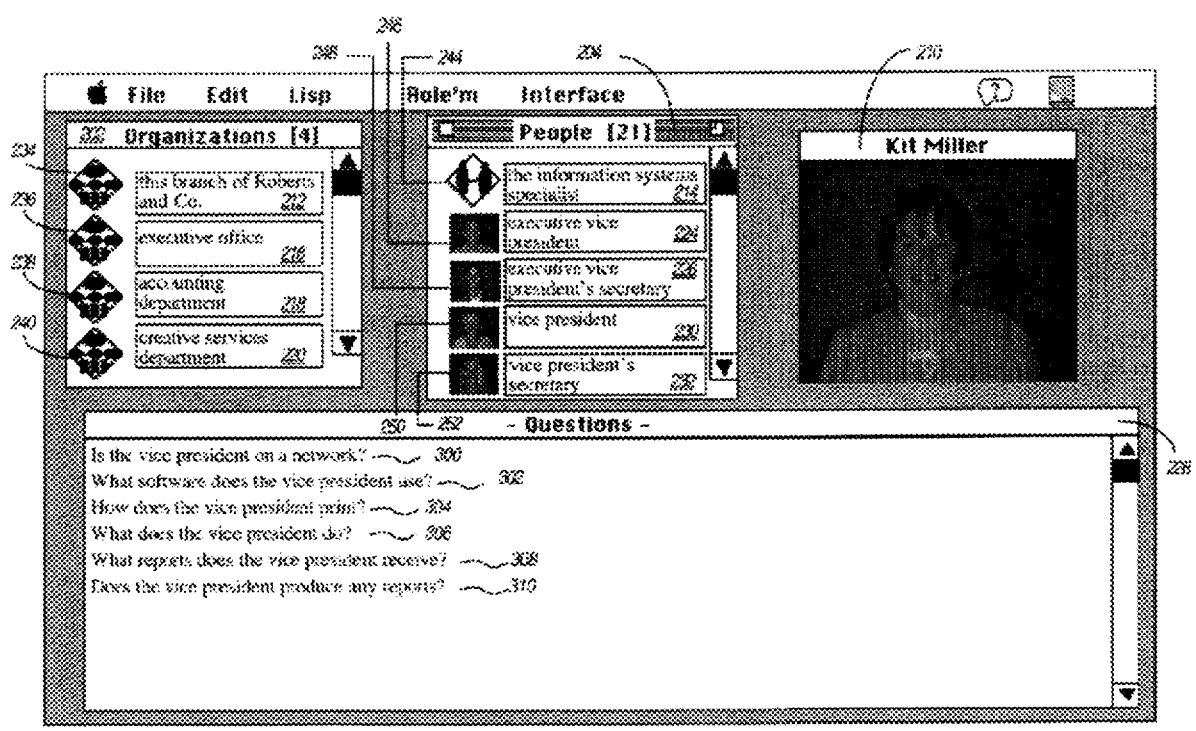
FIG. 3 illustrates the system interface upon selection of a first object value in accordance with the present invention.

Referring to FIGS. 3 through 15, a simulated interview between a sales person and a potential client is illustrated. In FIG. 3, the system interface is illustrated after selection of a first object value. The initial system interface presents two domain objects from which to choose. First, the domain object window Organizations 202 appears on the right side of the display. Second, the domain object window People 204 appears on the left side of the display.

As indicated by its outlined perimeter, object value 230 ("vice president") is selected from the People 204 domain object window. In response to this selection, the system interface presents six inquiries regarding the vice president within the questions-window 228. The six inquiries that are presented are referred to with reference numerals 300, 302, 304, 306, 308, and 310. Any of the presented inquiries regarding the vice president may be selected. Alternatively, another object value may be selected, from either the People 204 or Organizations 202 domain object windows, to produce alternative inquiries.

Figure 4:
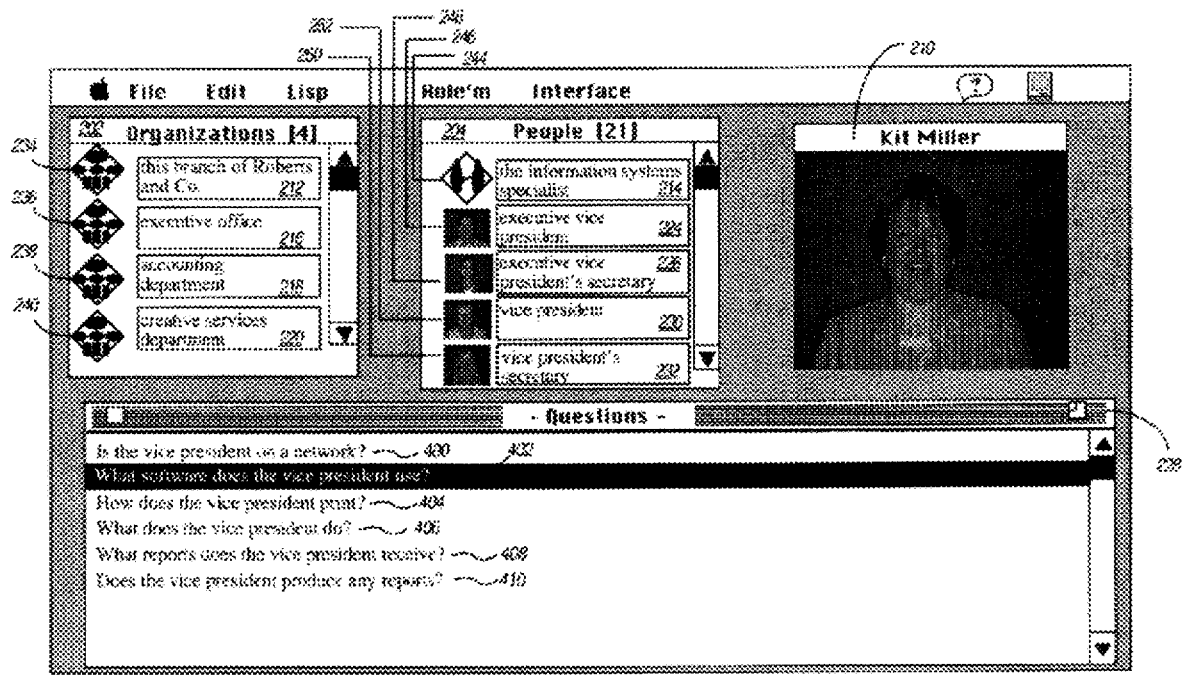
FIG. 4 illustrates the system interface upon selection of a first inquiry in accordance with the present invention.

Referring to FIG. 4, inquiry 402 ("[w]hat software does the vice president use?") is highlighted and selected for response. In reply to inquiry 402, the system interface responds as follows via the response window 210: "[s]he uses Microsoft Word, Macproject, and Powerpoint."

Figure 5:
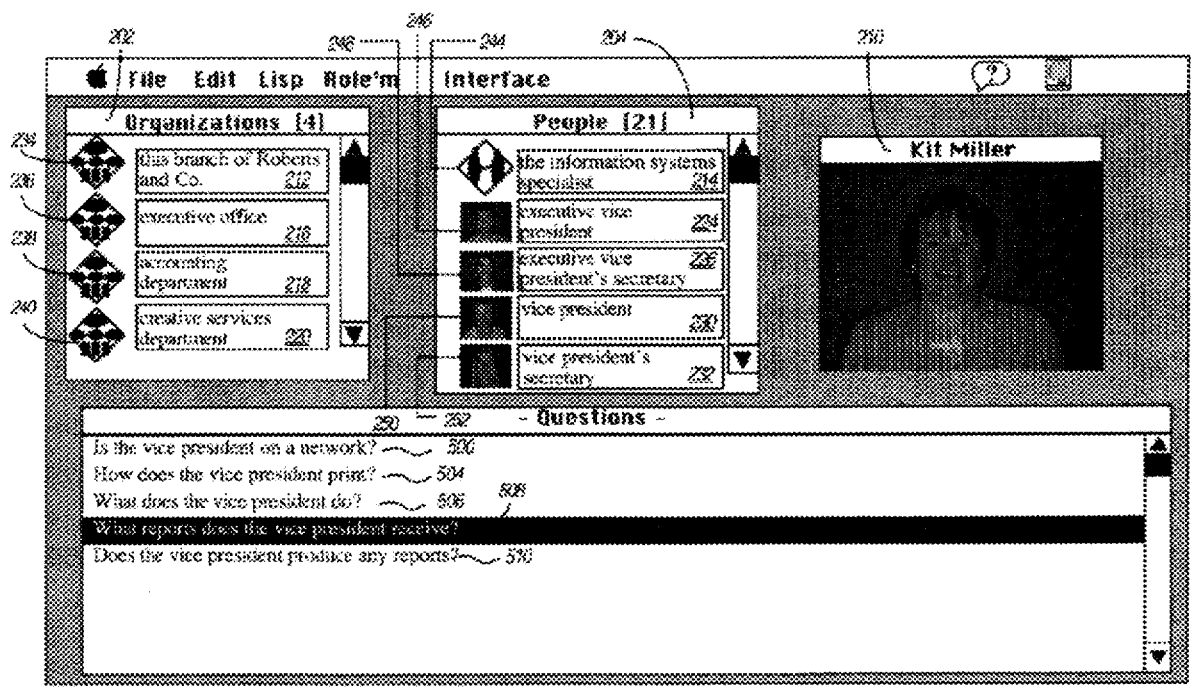
FIG. 5 illustrates the system interface after response to a first inquiry and selection of a second inquiry in accordance with the present invention.

Referring to FIG. 5, the system interface is illustrated after response to inquiry 302. The system interface removes the previously selected inquiry 402 yet retains unselected inquiries 300, 304, 306, 308, and 310 since the object value 230 ("vice president") selection has not been changed. Inquiry 308 ("[w]hat reports does the vice president receive?") is then highlighted and selected for response. In reply to inquiry 308, the system interface responds as follows via the response window 210: "[t]he monthly performance reports for the whole company, the monthly investment reports, and the monthly balance sheets."

Figure 6:
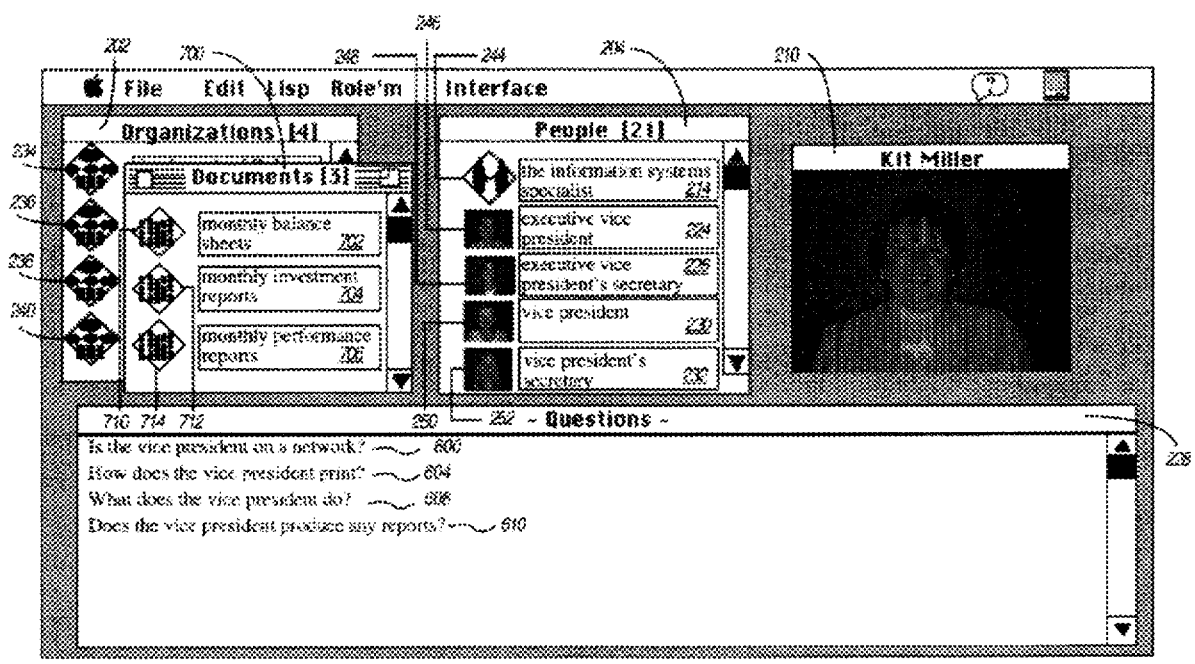
FIG. 6 illustrates the system interface after response to a second inquiry in accordance with the present invention.

Referring to FIG. 6, the system interface is illustrated after response to inquiry 308. The system interface removes the previously selected inquiry 308 yet retains unselected inquiries 300, 304, 306 and 310 since the selection of object value 230 ("vice president") has not been changed. In addition, the system interface has presented the Documents 600 domain object window, which overlays the Organizations 202 domain object Window, for selection. Within the Documents 600 domain object window are object values "monthly balance sheets", "monthly investment sheets", and "monthly performance sheets", which are referred to with reference numerals 602, 604, and 606, respectively. The production of the Documents 600 domain object window and its object values follows from the response to inquiry 308 which refers to these three documents.

Figure 7:
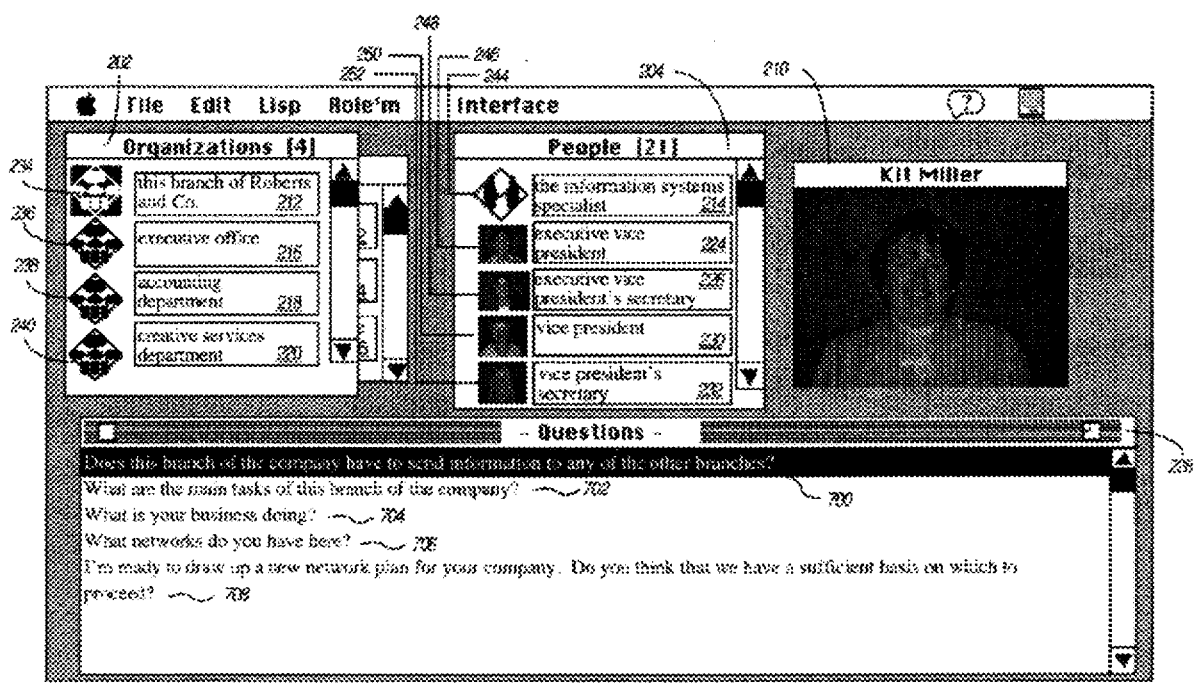
FIG. 7 illustrates the system interface upon removal of a domain object window from the system interface, selection of a new object value and selection of a third inquiry in accordance with the present invention.

Referring to FIG. 7, the system interface resulting from the removal of the Documents 600 domain objects window is illustrated. Thus, the Organizations 202 domain objects window is permitted to reappear for selection purposes. As illustrated by its outlined perimeter, object value 212 ("this branch of Roberts and Co.") is selected. Accordingly, the system interface generates inquiries that concern the branch of the vice president within the questions-window 228. Such inquiries are referred to with reference numerals 700, 702, 704, 706 and 708. Inquiry 700 "[d]oes this branch of the company have to send information to any of the other branches?") is then highlighted and selected for response. The system interface, through the response window 210, responds to inquiry 700 as follows: "[w]e send printed summary reports to New York each week."

Figure 8:
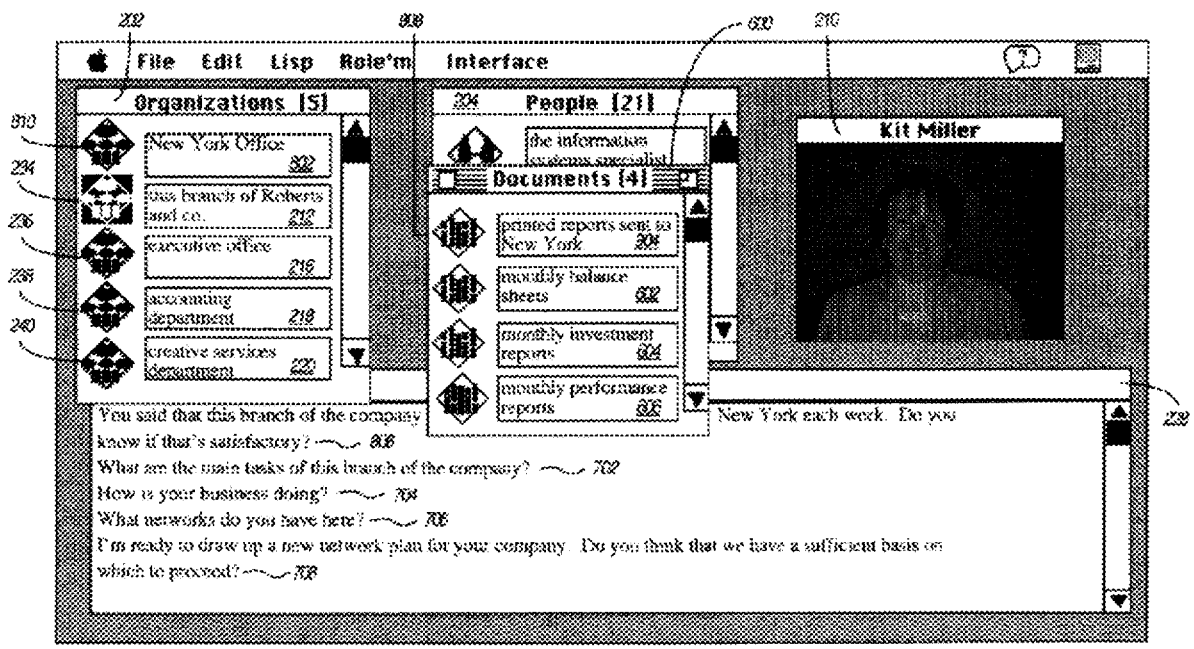
FIG. 8 illustrates the system interface after response to a third inquiry in accordance with the present invention.

Referring to FIG. 8, the system interface is illustrated after response to inquiry 700. The system interface removes the previously selected inquiry 700 yet retains unselected inquiries 702, 704, 706 and 708 since the selection of object value 212 has not been changed. The system interface also adds inquiry 806 which states: "[y]ou said that this branch of the company sends printed summary reports to New York each week. [d]o you know if that's satisfactory?". This follows from the response to inquiry 700 which refers to summary reports being sent to the New York office.

FIG. 8 also illustrates the reemergence of the Documents 600 domain object window having an additional object value as well as the addition of an object value-to the Organizations 202 domain object window. Object value 802 ("New York office") with icon 810 and object value 804 ("printed reports sent to New York") with icon 808 have been produced within the Organizations 202 and Documents 600 object windows, respectively. This follows from the previous response to inquiry 700 which refers to summary reports being sent to the New York office.

Figure 9:
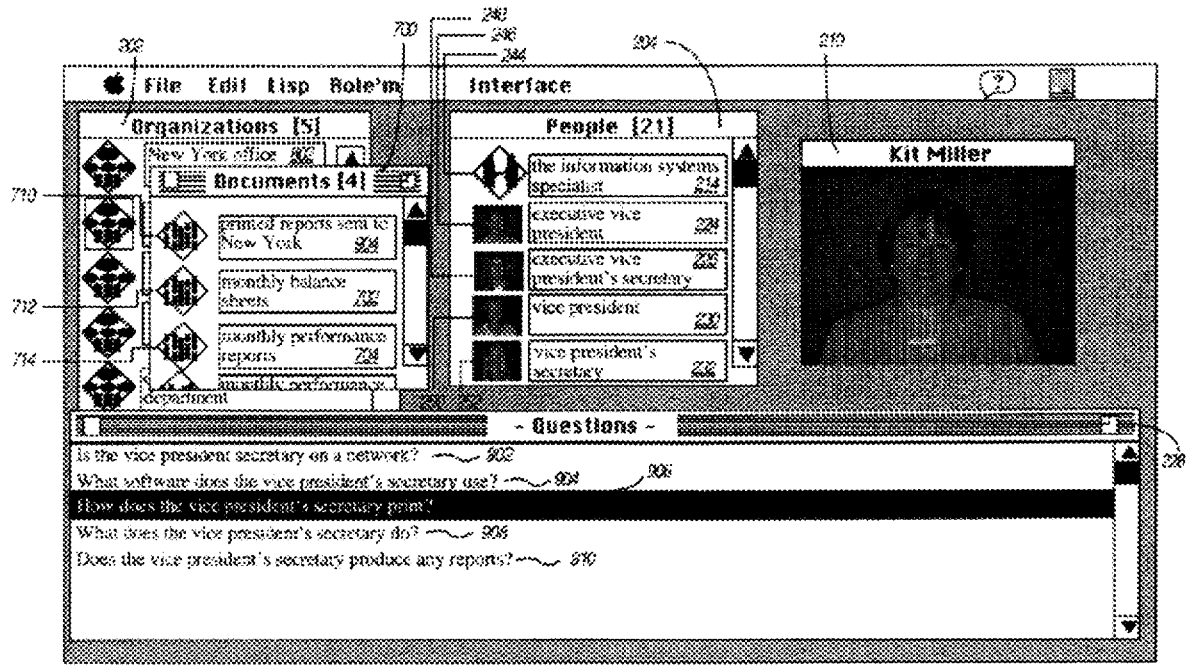
FIG. 9 illustrates the system interface upon selection of a new object value, and selection of a fourth inquiry in accordance with the present invention.

Referring to FIG. 9, object value 232 ("vice president's secretary") of the People 204 domain object window is selected. Such selection causes inquiries 902, 904, 906, 908, and 910, to be produced within the questions-window 228. Inquiry 906, which states "[h]ow does the vice president's secretary print?", is then highlighted and selected for response. The system interface, through the response window 210, responds to inquiry 906 as follows: "[s]he prints on the laserwriter attached to her machine."

Figure 10:
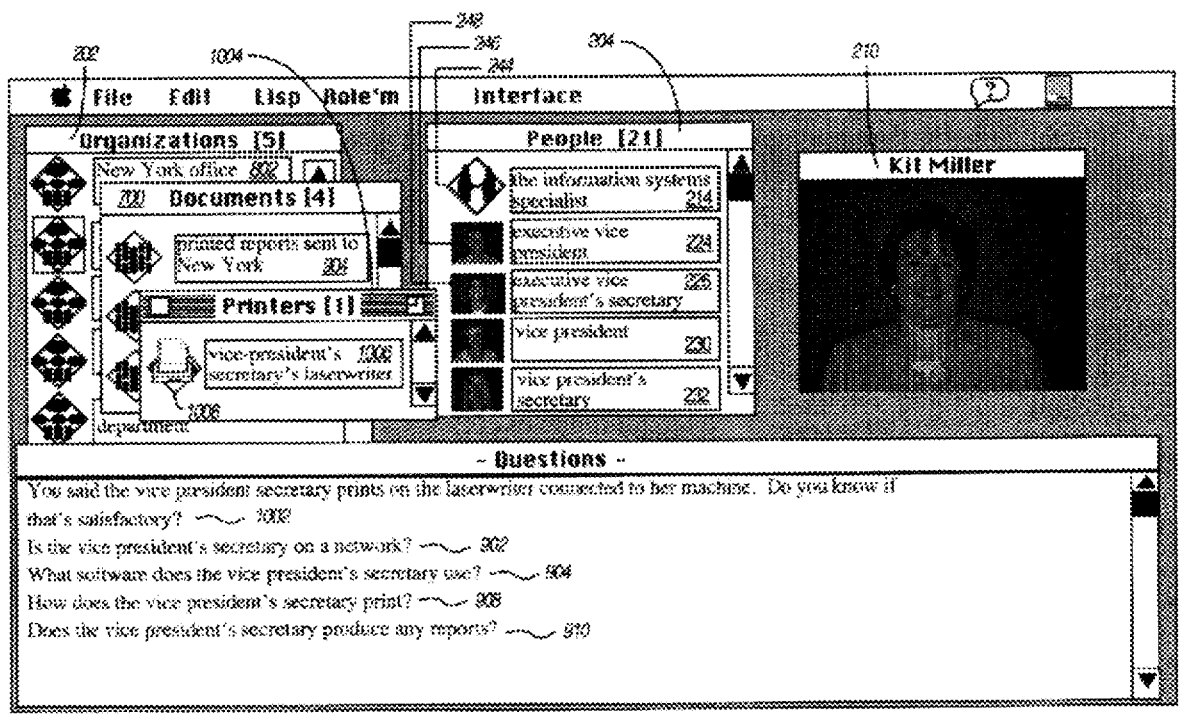
FIG. 10 illustrates the system interface after response to a fourth inquiry in accordance with the present invention.

Referring to FIG. 10, the system interface is illustrated after response to inquiry 906. The system interface removes the previously selected inquiry 906 yet retains unselected inquiries 902, 904, 908, and 910, since the selection of object value 232 ("the vice president's secretary") has not been changed. In addition, the system interface has added inquiry 1002 which states "[y]ou said that the vice president's secretary prints on the laserwriter connected to her machine. [d]o you know if that's satisfactory?" to the questions-window 228. This addition, represents, the growth of knowledge in the user with respect to the vice president's secretary's use of a laserwriter. Furthermore, an object window entitled Printers 1004 with object value 1006 ("vice president's secretary's laserwriter") and corresponding icon 1008 is presented.

Figure 11:
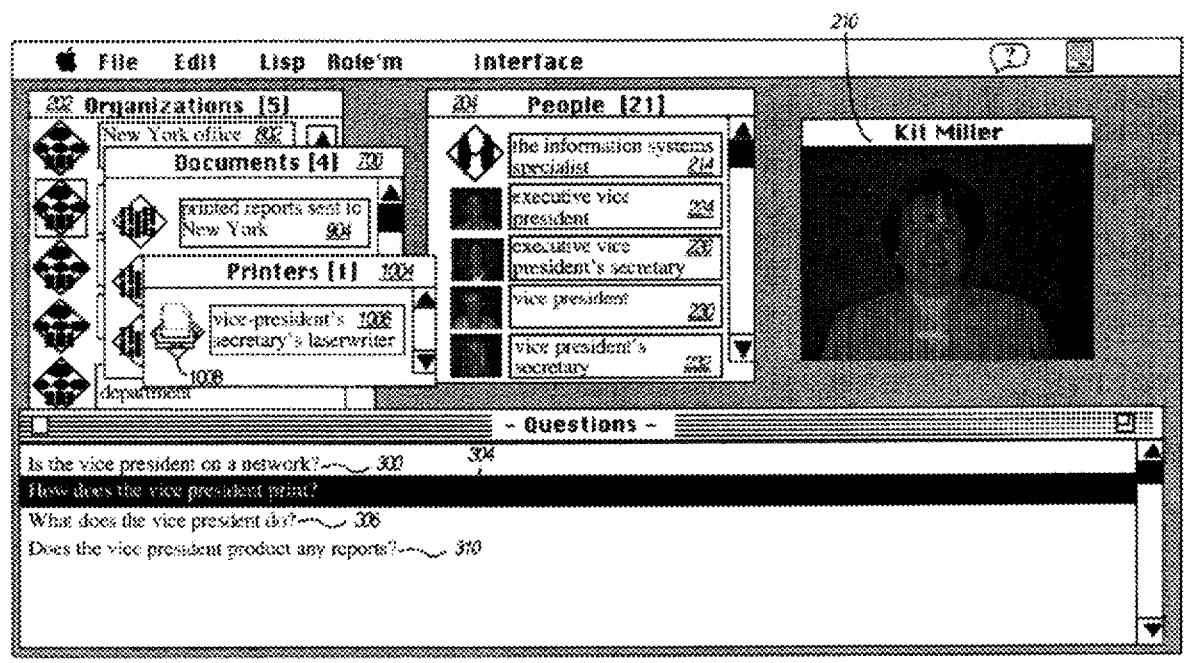
FIG. 11 illustrates the system interface upon selection of a new object value, and selection of a fifth inquiry in accordance with the present invention.

Referring to FIG. 11, object value 230 ("the vice president") is selected. Accordingly, questions regarding the vice president are produced within the questions-window 228. Thereafter, inquiry 304, which states "[h]ow does the vice president print?", is highlighted and selected for response. In reply to inquiry 304, the system interface responds as follows via the response window 210: "[s]he passes disks to her secretary who prints documents on the laserwriter attached to her machine."

Figure 12:
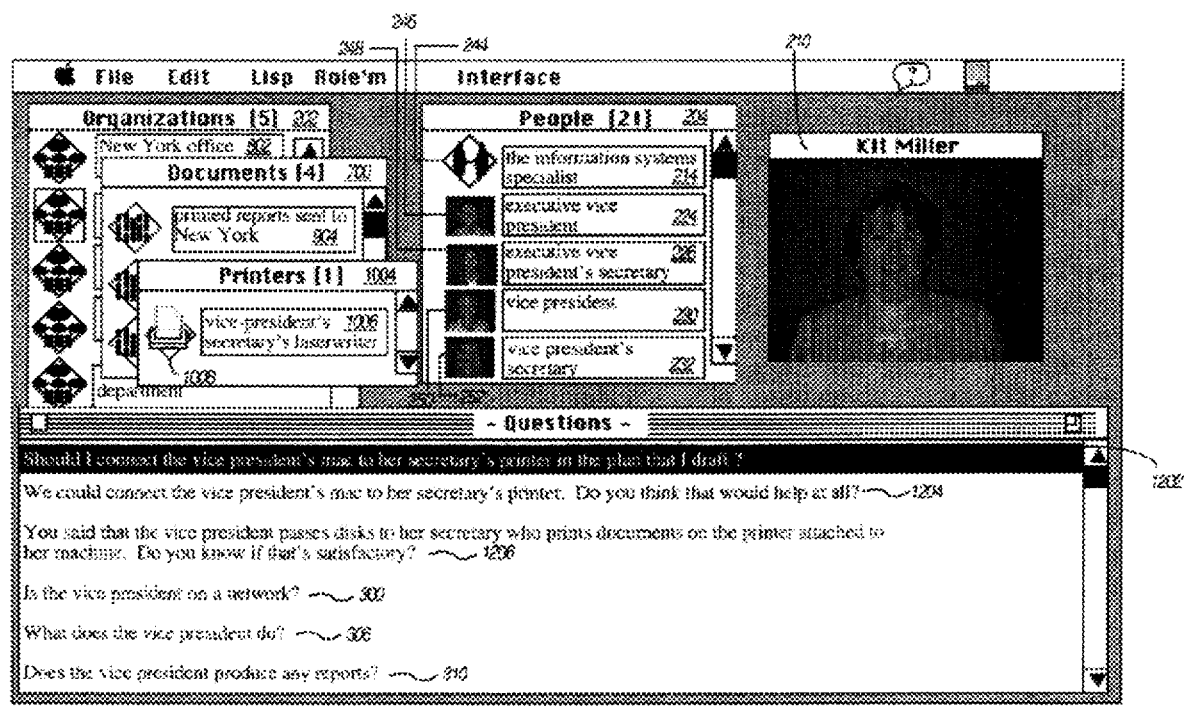
FIG. 12 illustrates the system interface after response to a fifth inquiry and upon selection of a sixth inquiry in accordance with the present invention.

Referring to FIG. 12, the system interface is illustrated after response to inquiry 304. The system interface removes the previously selected inquiry 304 yet retains unselected inquiries 300, 306, and 310 since the selection of object value 230 ("the vice president") has not been changed. In addition, the system interface has added inquiries 1202 ("[s]hould I connect the vice president's mac to her secretary's printer in the plan that I draw up?"), 1204 ("[w]e could connect the vice president's mac to her secretary's printer. [d]o you think that would help at all?"), and 1206 ("you said that the vice president passes disks to her secretary who prints documents on the printer attached to her machine. [d]o you know if that's satisfactory?") to the questions-window 228. Inquiry 1202 is thereafter highlighted and selected for response. In reply to inquiry 1202, the system interface responds as follows via the response window 210: "[y]es I think so."

Figure 13:
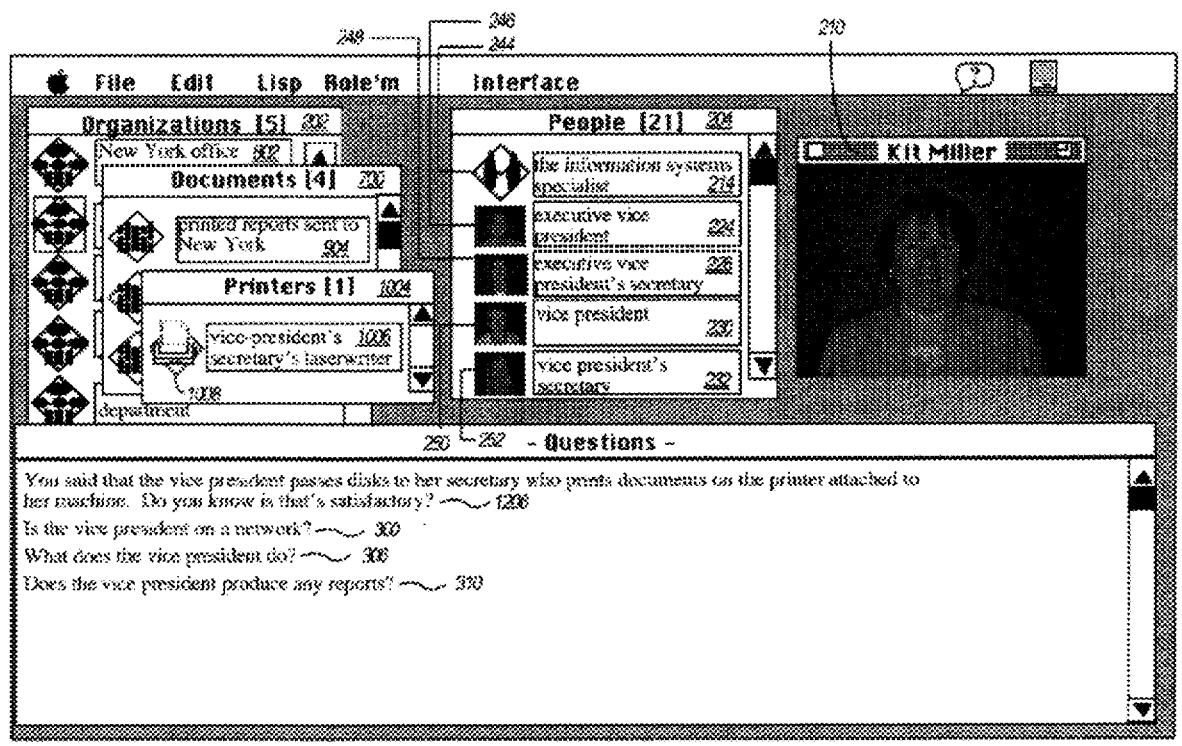
FIG. 13 illustrates the system interface after response to a fourth inquiry in accordance with the present invention.

Referring to FIG. 13, the system interface is illustrated after response to inquiry 1202. It should be noted that inquiries 1204 and 1206, which were generated in response to the fifth inquiry yet not selected, have been removed from the questions-window 228. This results since inquiries 1204 and 1206 would not be proper in light of the response of the system interface to inquiry 1202.

Figure 14:
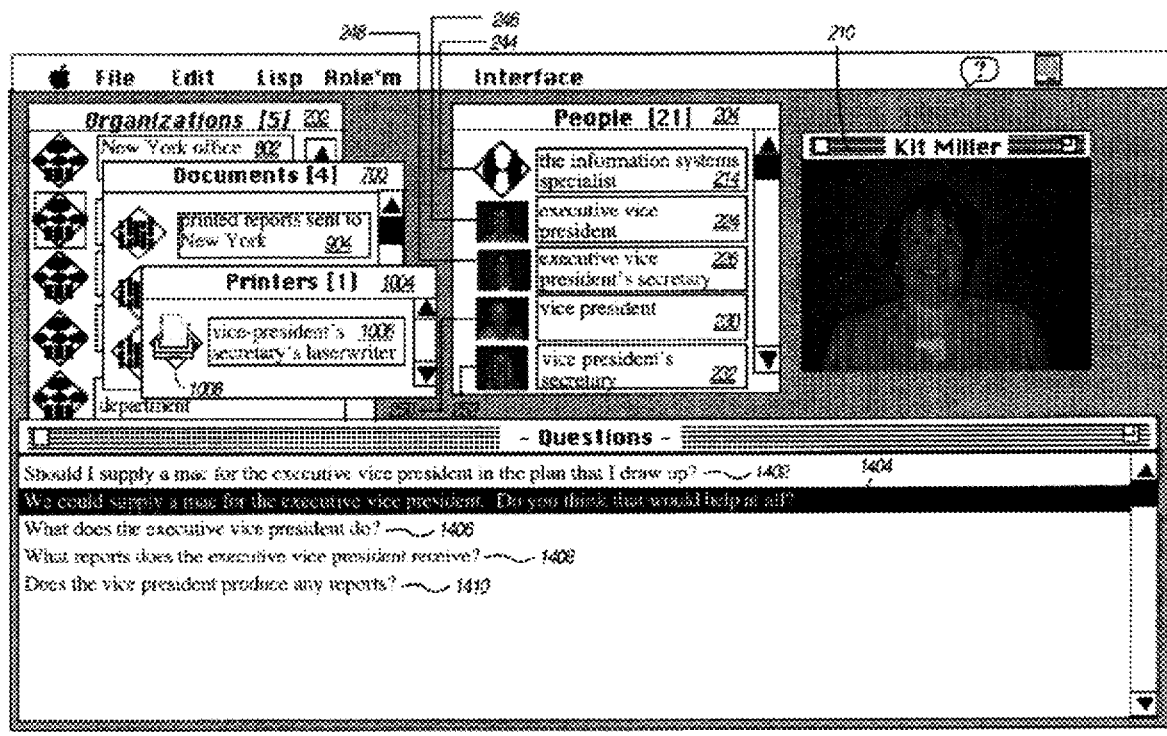
FIG. 14 illustrates the system interface upon selection of a new object value, and selection of a seventh inquiry in accordance with the present invention.

Referring to FIG. 14, object value 224 ("executive vice president") is selected. Accordingly, inquiries regarding the executive vice president are produced within the questions-window 228. Such inquiries are referred to with reference numerals 1402, 1404, 1406, 1408, and 1410. Thereafter, inquiry 1404 ("[w]e could supply a mac for the executive vice president. [d]o you think that would help at all?") is highlighted and selected for response. In reply to inquiry 1404, the system interface responds as follows via the response window 210: "[i]t's too expensive for the advantages that it offers."

Figure 15:
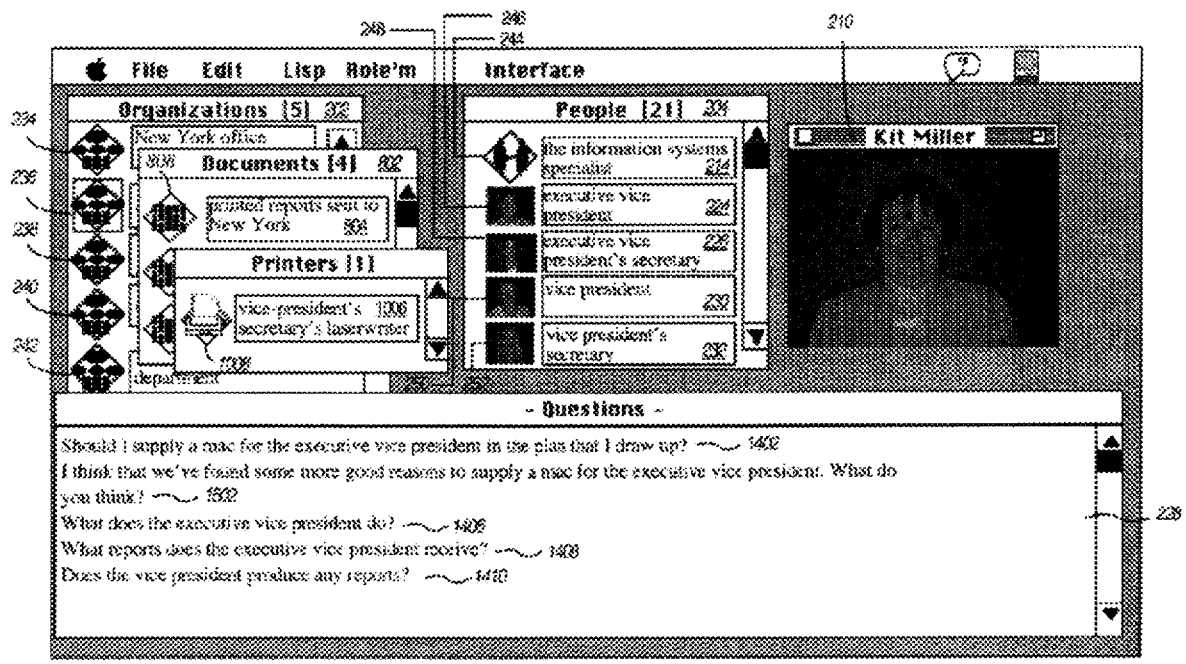
FIG. 15 illustrates the system interface after response to a seventh inquiry in accordance with the present invention.

Referring to FIG. 15, the system interface is illustrated after response to inquiry 1404. The system interface removes the previously selected inquiry 1404 and replaces it with inquiry 1502 which states "[i]think that we've found some more good reasons to supply a mac for the executive vice president, [w]hat do you think?". Inquiry 1502 allows the user to again forward inquiry 1404, while taking into account its former objection, at a later time when the user feels that the simulated person may change her response.

KNOWLEDGE BASE OF THE DIALOGUE SYSTEM

Object values each contain a number of slots. A slot is a memory item which contains a particular value. Every object value has a slot for each of three possible textual descriptions. The three textual descriptions are: (i) the simulation-description slot whose value is used in answers given by the simulated person; (ii) the user-description slot whose value is used in questions available to the user; and (iii) the icon-description slot, the value for which appears beside the icon that represents the object value. If the user-description slot is empty, its value defaults to that of the simulation-description. Similarly, if the icon-description slot is empty, its value defaults to that of the user-description.

For example, if the object value were the information systems specialist, each textual description would contain its own value. Specifically, the icon-description would simply be "information systems specialist." In contrast, the simulated-description would be "me" whereas the user-description would be "you."

An example of an instance in which a default occurs is when the object value is simply a thing. For example, if the simulation-description is "the third floor network," both the user-description and the icon-description default their values to the value of the simulation description.

Figure 16:
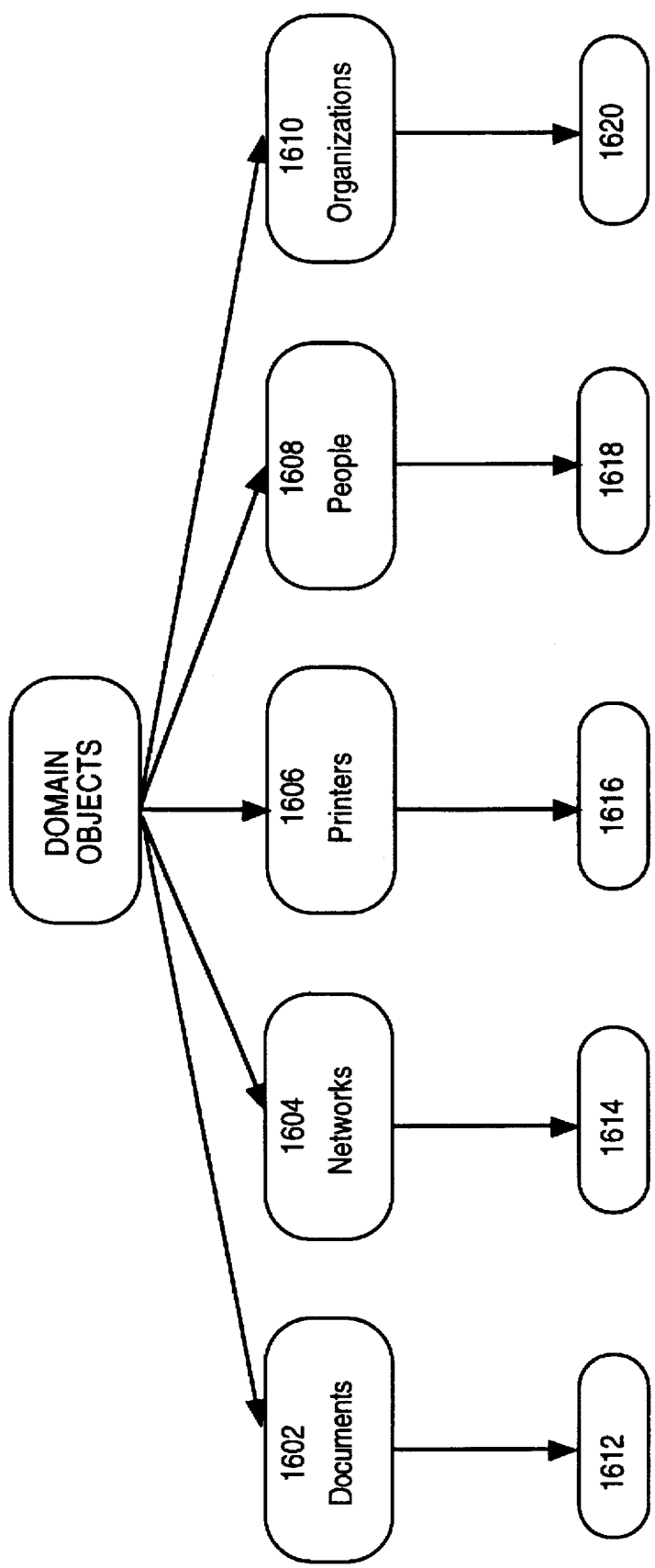
FIG. 16 illustrates a hierarchy flowchart of a simulation knowledge base of a system interface for a simulated interview between a sales person and a potential client in accordance with the present invention.

The present invention requires a knowledge-base modeling the structure of the domain. Referring to FIG. 16, a hierarchy for a knowledge base for a simulated sales interview between a sales-person and a potential client is illustrated. As illustrated by FIG. 16, there are five domain objects at the first level of the hierarchy. Namely, the domain objects are Documents, Networks, Printers, People, and Organizations, which are referred to with reference numerals 1602, 1604, 1606, 1608, and 1610, respectively. Each of these domain objects further contains a set of corresponding object values. Accordingly, domain objects Documents 1602, Networks 1604, Printers 1606, People 1608 and Organizations 1610, have object value sets 1612, 1614, 1616, 1618 and 1620, respectively. For example, a document can contain values including "ledger sheets" and "daily job cost reports".

When the system is initialized, the knowledge base contains information which the user is familiar with. That information defines a set of objects and object values that are initially displayed to the user in the dialogue system. As the underlying system responds to a user's questions, the dialogue system's knowledge base is expanded with the acquired information. This expanded information is conveyed to the user via additional objects.

SYSTEM INTERFACE OPERATION

Figure 17:
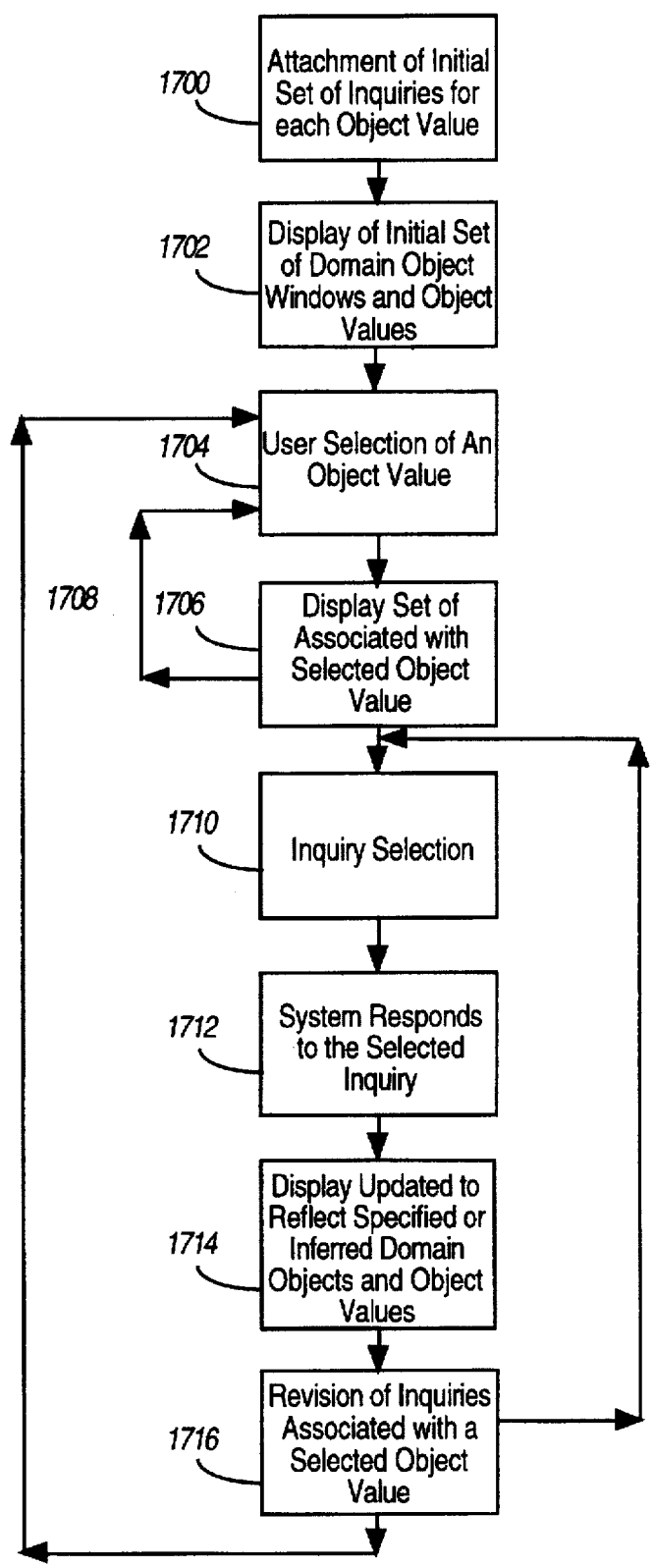
FIG. 17 illustrates a flowchart depicting the operation of the system interface in accordance with the present invention.

Referring to FIG. 17, a flowchart depicting the operation of the system interface is illustrated.

First, the system interface attaches an initial set of inquiries for each object value as indicated by block 1700. Second, the interface system displays an initial set of domain object windows and object values, a blank questions window and an initialized response window. This is indicated by block 1702. Thereafter, the user selects a particular object value as denoted by block 1704. Once the user has made this selection, the system interface instantiates the template corresponding to the domain object and the inquiries attached to that particular object value. This is denoted by block 1706. If the user is dissatisfied with the inquiries proffered by the system interface, block 1704 may be revisited until the desired inquiries corresponding to a particular object value are advanced. This is indicated by logic flow path 1708.

Upon advancement of a desired inquiry, the inquiry is selected and submitted to the underlying system for response as indicated by block 1710. The underlying system delivers the response associated with the inquiry via the response window 210. As an additional response to the inquiry, the system interface is updated so as to display specified domain objects and object values that are referred to or inferred from the response. In further response to the submitted inquiry, the system interface revises the set of inquiries associated with the selected object value by utilizing specified procedures. The aforementioned system interface responses to the submitted inquiry are referred to within FIG. 17 by reference numerals 1712, 1714, and 1716, respectively.

Subsequent to the system response to the submitted inquiry, the user may: (i) select another object value from which diverse inquiries will be displayed and control is passed to block 1704; or (ii) select an inquiry from the updated set of inquiries for the object value previously selected, and control is returned to function block 1710.

Figure 18:
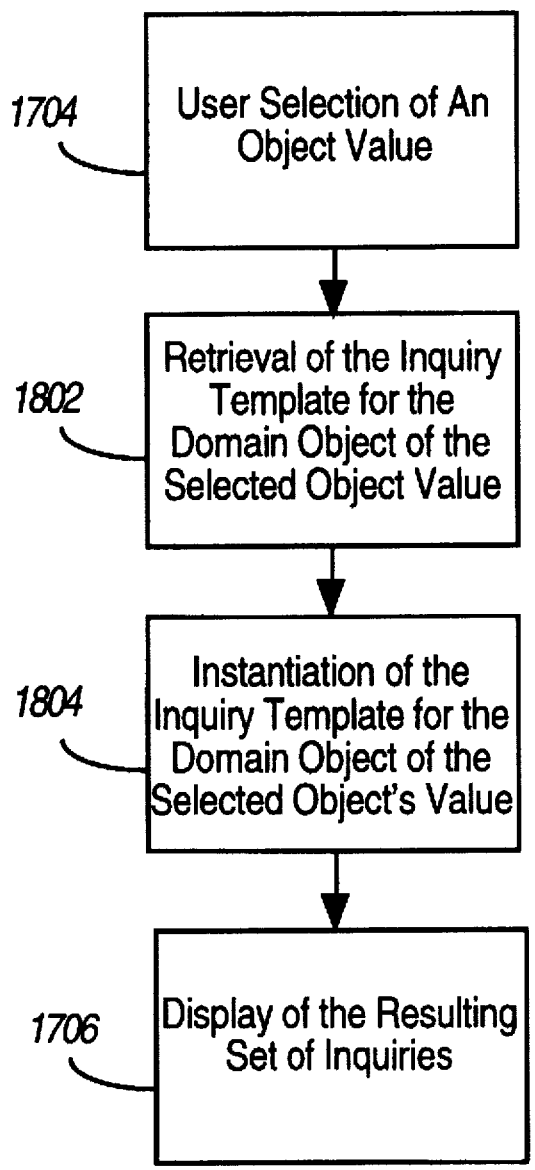
FIG. 18 illustrates a flowchart depicting the operation of the system interface in formulating and displaying inquiries from a selected object value.

Referring to FIG. 18, a flowchart depicting the operation of the system interface in formulating and displaying inquiries from a selected object value is illustrated. Upon user selection of a particular object value, as indicated by block 1704, the inquiry template for the domain object of the particular object value is retrieved. This is indicated by block 1802. Thereafter, the retrieved inquiry template is instantiated with the particular object value as indicated by block 1802. Consequently, a resulting set of inquiries is displayed as indicated by block 1706.

Once an inquiry has been selected, the inquiry is processed. Processing the inquiry causes an action associated with the inquiry to be executed. Such action may cause the user knowledge base to be updated, and therefore present more domain objects and object values on the interface to be used in future inquiries.

The system records the objects in the domain about which the user has been made aware of by the system responses. Each object value that is introduced by a response is represented by an icon in the appropriate domain object window. In addition, the system also predicts object values that should be inferred from each response and introduces such object values onto the interface.

The mechanism by which an object value is inferred utilizes slots that pertain to each object value. Every object value has a slot which lists other object values which can be directly inferred from it. Consequently, all object values which are slotted as being inferable from an object value included within a response, are introduced for selection. For example, after the inquiry, "who prepares the report on locally controlled investments?" and the response "the business manager's assistant" a new object value of "business manager's assistant" is presented. However, the system also expects the user to infer that there is a "business manager." Consequently, an icon for the object value of "business manager" will be presented.

After each response, the inference mechanism collects all the object values referred to within the response as well as all the objects which can be inferred from them. Any collected object values, which do not have corresponding domain object windows that are already displayed upon the system interface, are inserted upon the system interface within their corresponding domain object window.

Any collected object values, which have corresponding domain object windows that are already displayed upon the system interface, are inserted within their corresponding domain object window.

Figure 19:
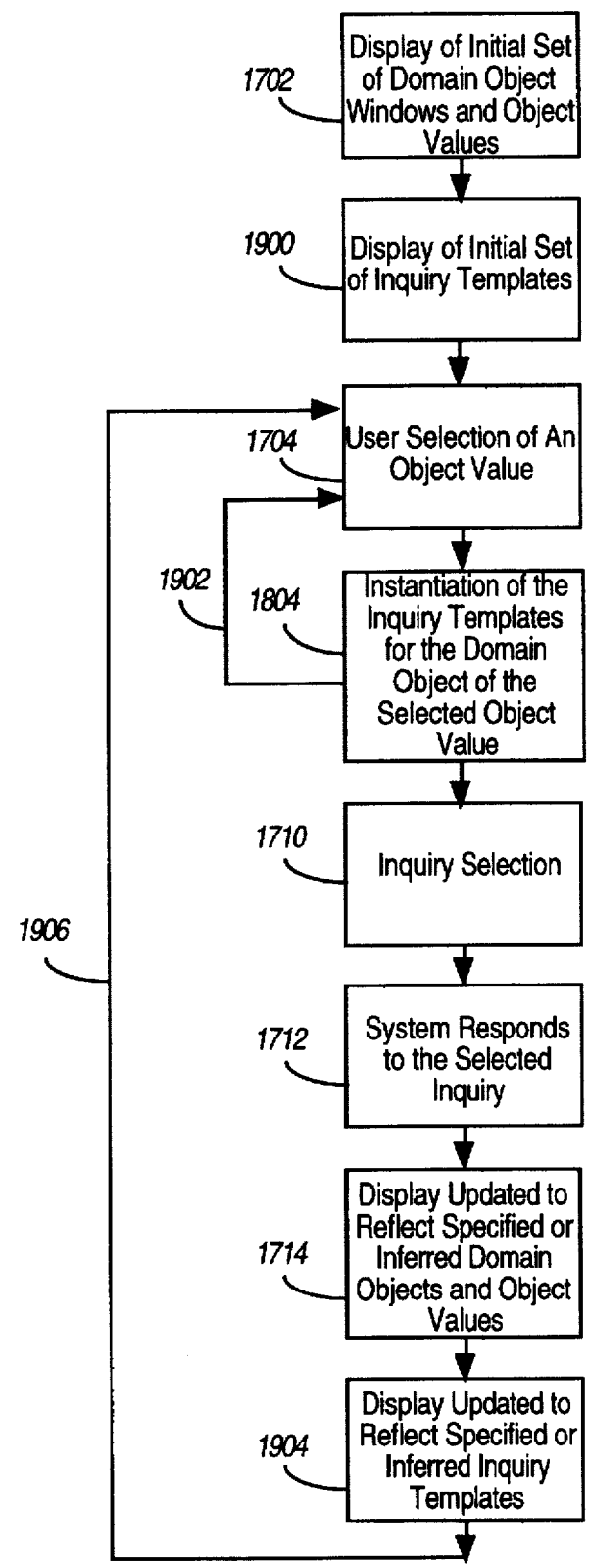
FIG. 19 illustrates a flowchart showing the operation of the system interface incorporating inquiry templates.

FIG. 19 depicts a flowchart showing the operation of the system interface incorporating inquiry templates.

First, the system interface displays an initial set of domain object windows and object values as indicated by block 1702. Second, the system interface displays an initial set of inquiry templates as indicated by block 1900. The user selects an object value, as denoted by block 1704, and the system instantiates the set of inquiry templates with the domain object of the selected object value, as shown by block 1804. The user can revisit block 1704 to further instantiate the set of inquiry templates, as shown by logic flow path 1902. Thereafter, the user selects an inquiry, and the system responds to the selected inquiry, as shown in blocks 1710 and 1712. The display is updated to reflect specified or inferred domain objects and inquiry templates for further selection by the user, as shown in block 1714, block 1904 and logic flow path 1906.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. In a computer having a display means and a topically organized database containing objects, inquiries and responses, a method for communicating with the computer using realistic dialogue, comprising the steps of:
   (a) displaying a plurality of objects;
   (b) selecting an object;
   (c) displaying a plurality of inquiries based on the selected object;
   (d) selecting an inquiry;
   (e) responding to the selected inquiry with a response; and
   (f) updating the objects based on the response.

2. The method as recited in claim 1, including the step of presenting a question window for displaying the plurality of inquiries.

3. The method as recited in claim 1, including the step of presenting an object window for displaying the plurality of objects.

4. The method as recited in claim 1, including the step of presenting a response window for conveying the response.

5. The method as recited in claim 1, wherein the response to the selected inquiry is dependent on at least one prior response.

6. The method as recited in claim 1, wherein the response to the selected inquiry is dependent on at least one prior inquiry.

7. In a computer having a display means and a topically organized database containing objects, inquires and responses, a method for communicating with the computer using realistic dialogue, comprising the steps of:
   (a) displaying a plurality of objects, each object having at least one corresponding value;
   (b) selecting an object;
   (c) displaying a plurality of inquiries based on the at least one corresponding value of the selected object;
   (d) selecting an inquiry;
   (e) responding to the selected inquiry with a response; and
   (f) updating the objects based on the response.

8. The method as recited in claim 7, wherein the objects are updated based on at least one term found within the response.

9. The method as recited in claim 7, wherein the objects are updated based on at least one term anticipated from the response.

10. The method as recited in claim 7, including the step of updating the plurality of inquiries based on the response.

11. The method as recited in claim 7, wherein the response to the selected inquiry is dependent on at least one prior response.

12. A method for communicating with a computer having a topically organized database using realistic dialogue, comprising the steps of:
   (a) displaying a plurality of objects and a plurality of inquiry templates, each object having at least one corresponding value;
   (b) selecting an inquiry template and at least one object;
   (c) displaying a plurality of inquiries based on the selected inquiry template and object;
   (d) selecting an inquiry;
   (e) responding to the selected inquiry with a response; and
   (f) updating the objects and inquiry templates based on the response.

13. The method as recited in claim 12, wherein the step of selecting an inquiry template and at least one object further includes the step of instantiating the selected inquiry template based on the at least one corresponding value of the selected object.

14. An apparatus for communicating with a computer having a topically organized database using realistic dialogue, comprising:
   (a) displaying means for displaying a plurality of objects;
   (b) a user interface for selecting an object;
   (c) display means for displaying a plurality of inquiries based on the selected object;
   (d) a user interface for selecting an inquiry; and
   (e) processor means for responding to the selected inquiry with a response and for updating the objects based on the response.

15. The apparatus as recited in claim 14, including display means for presenting a question window for displaying the plurality of inquiries.

16. The apparatus as recited in claim 14, including display means for presenting an object window for displaying the plurality of objects.

17. The apparatus as recited in claim 14, including display means for presenting a response window for conveying the response.

18. The apparatus as recited in claim 14, wherein the processor means responds to the selected inquiry with a response that is dependent on at least one prior response.

19. The apparatus as recited in claim 14, wherein the processor means responds to the selected inquiry with a response that is dependent on at least one prior inquiry.

20. An apparatus for communicating with a computer having a topically organized database using realistic dialogue, comprising:

(a) display means for displaying a plurality of objects, each object having at least one corresponding value;

(b) a user interface for selecting an object;

(c) processor means for selecting a plurality of inquiries based on the corresponding value of the selected object;

(d) display means for displaying the plurality of inquiries;

(e) a user interface for selecting an inquiry;

(f) processor means for responding to the selected inquiry with a response; and (g) processor means for updating the objects based on the response.

21. The apparatus as recited in claim 20, wherein the objects and values are updated based on at least one term found within the response.

22. The apparatus as recited in claim 20, wherein the objects and values are updated based on at least one term anticipated from the response.

23. The apparatus as recited in claim 20, including a processor means for updating the plurality of inquiries based on the response.

24. The apparatus as recited in claim 20, wherein the processor means for responding responds to the selected inquiry with a response that is dependent on at least one prior response.

25. An apparatus for communicating with a computer having a topically organized database using realistic dialogue, comprising:

(a) display means for displaying a plurality of objects and a plurality of inquiry templates;

(b) a user interface so that the user can select an inquiry template and at least one object;

(c) display means for displaying a plurality of inquiries based on the selected inquiry template and the selected object;

(d) a user interface so that a user can select an inquiry;

(e) processor means for responding to a selected inquiry with a response; and (f) processor means for updating the objects and inquiry templates based on the response.

26. The apparatus as recited in claim 25, including processor means for instantiating the selected inquiry template with the value of the selected object.

* * * * *

UNITED STATES PATENT AND TRADEMARK OFFICE
CERTIFICATE OF CORRECTION

PATENT NO : 5,721,845

DATED : February 24, 1998

INVENTOR(S): James, et al.

It is certified that error appears in the above-identified patent and that said Letters Patent is hereby corrected as shown below:

In the claims:

Claim 14, column 12, line 56, "(a) displaying means" should read --(a) display means--

Signed and Sealed this

Tenth Day of November 1998

*Attest:*

BRUCE LEHMAN

*Attesting Officer*     *Commissioner of Patents and Trademarks*